United States Patent

Asou et al.

[11] Patent Number: 5,437,306
[45] Date of Patent: Aug. 1, 1995

[54] DOUBLE-SOLENOID TYPE ELECTROMAGNETIC VALVE

[75] Inventors: Yoshio Asou; Bunya Hayashi; Hideharu Sato; Takumi Matsumoto; Makoto Ishikawa; Ryushirou Kaneko; Keisuke Shimauchi; Shinichi Yoshimura, all of Yawara, Japan

[73] Assignee: SMC Corporation, Tokyo, Japan

[21] Appl. No.: 158,797

[22] Filed: Dec. 1, 1993

[51] Int. Cl.⁶ .......................................... F15B 13/043
[52] U.S. Cl. .................................. 137/625.64; 137/884
[58] Field of Search .......................... 137/624.64, 884

[56] References Cited

U.S. PATENT DOCUMENTS

| | | |
|---|---|---|
| 3,318,565 | 5/1967 | Cutler . |
| 3,425,449 | 2/1969 | Leibfritz . |
| 3,934,605 | 1/1976 | Legris ................................. 137/884 |
| 5,137,455 | 8/1992 | Moerbe et al. .................. 137/884 X |

FOREIGN PATENT DOCUMENTS

| | | |
|---|---|---|
| 1054297 | 4/1959 | Germany . |
| 63-53378 | 3/1988 | Japan .............................. 137/625.64 |
| 64-41778 | 3/1989 | Japan . |
| 3-20185 | 1/1991 | Japan .............................. 137/625.64 |
| 4-60287 | 2/1992 | Japan .............................. 137/625.64 |
| 5-13009 | 2/1993 | Japan . |
| 577653 | 7/1976 | Switzerland . |

Primary Examiner—Gerald A. Michalsky
Attorney, Agent, or Firm—Oblon, Spivak, McClelland, Maier & Neustadt

[57] ABSTRACT

A double-solenoid type electromagnetic valve having two solenoids integrally connected is disclosed. The solenoids of the electromagnetic valve have the same structure and the same external shape and have connecting mechanisms with engaging rims and engaging grooves on the sides. By connecting the connecting mechanisms with each other, the solenoids are closely connected and overlapped without any gap between them.

7 Claims, 5 Drawing Sheets

DOUBLE-SOLENOID TYPE ELECTROMAGNETIC VALVE

FIELD OF THE INVENTION

The present invention relates to a double-solenoid type electromagnetic valve provided with two solenoid mechanisms.

BACKGROUND OF THE INVENTION

Double-solenoid type electromagnetic valve provided with two solenoid mechanisms has been widely known in the past. In general, the electromagnetic valve of this type comprises a main valve unit having a spool type main valve disc to control main fluid, and a pilot valve unit to control pilot fluid, whereby the pilot valve unit is provided with two solenoid mechanisms, and these solenoid mechanisms are actuated alternately to control supply and discharge of the pilot fluid. By applying operating force of pilot fluid pressure alternately on both sides of the main valve disc, the main valve disc is switched over.

In the double-solenoid type electromagnetic valve as described above, two solenoid mechanisms are integrally molded to facilitate the operation by reducing the number of components as disclosed in Japanese Utility Model Laid-Open Publication 64-41778.

However, when two solenoid mechanisms are integrally molded, and if trouble occurs to one of the solenoids, it is not possible to replace only the solenoid in trouble, but the other solenoid not in trouble must also be abandoned. Because the solenoid mechanism occupies considerable percentage in the cost of the electromagnetic valve, economic loss due to the abandonment of the solenoids is extremely high.

As a double-solenoid type electromagnetic valve without such disadvantage, the one with two solenoids separately furnished is also known, and one of such examples is disclosed in Japanese Utility Model Laid-Open Publication 5-13009, which has been filed by the present applicant. In this valve, two solenoid mechanisms are mounted on a pilot valve body having a pilot supply valve seats to be opened and closed by these solenoids on upper surface and lower surface thereof in such manner that one of the solenoid mechanisms is positioned on upper surface and the other is positioned on lower surface. As a result, the pilot valve unit is extremely long in longitudinal direction compared with the main valve unit. This leads to a large size valve and also causes problems such as the restriction to the mounting condition of electromagnetic valve because the pilot valve unit is extensively projected upward and downward. Moreover, it is necessary to fix two solenoids and pilot valve body integrally by a plurality of bolts and then to fix it on the main valve unit by bolts. This means further trouble in assembling procedure and replacement of solenoids when trouble occurs. As the means to supply electric power to the two solenoids, electric wires are connected to terminals of the solenoids by means such as brazing or screw. This leads to troubles in operation and in replacement of the solenoids.

Further, according to Japanese Utility Model Laid-Open Publication 5-13009, in case solenoids are out of operation due to accident such as power suspension, two manual operators to match each of the solenoids are provided on upper surface of the valve body to switch over the main valve disc by manual operation, while these manual operators are aligned closer to each other in lateral direction of the valve body, and it often leads to erroneous operation because operator tends to switch over two manual operators and main valve disc in erroneous direction. Moreover, because the two manual operators are designed to switch over communication of passages where pilot fluid flows, it is difficult to adequately arrange the pilot passage when these are arranged in narrow space closer to each other, and the problems for designing and manufacture occur because the passages must be designed as bypass.

SUMMARY OF THE INVENTION

It is a primary object of the present invention to provide a double-solenoid type electromagnetic valve, by which it is possible to connect two solenoids in firm and compact manner by simple method and to easily separate and replace the solenoids when trouble occurs.

It is another object of the present invention to provide a double-solenoid type electromagnetic valve as described above provided with two solenoids, which can be connected in easy and compact manner, and power to the two solenoids can be supplied by simple assembling procedure and with good interchangeability of solenoids.

It is still another object of the present invention to provide a double-solenoid type electromagnetic valve with two solenoids connectable in easy and compact manner, whereby two manual operators to match the two solenoids are provided without causing erroneous operation and to facilitate easy formation of passage.

To attain the above objects, the double-solenoid type electromagnetic valve of the present invention comprises a main valve disc unit having a main valve disc slidable in axial direction in a valve casing and a pair of pistons mounted on axial ends of said main valve disc and controlling main fluid by switching over the main disc by these pistons driven by pilot fluid pressure, and a pilot valve unit having two solenoid mechanisms and for selectively applying pilot fluid pressure on said pistons by action of these solenoids, whereby the two solenoids in said pilot valve unit have the same structure and the same external shape and are provided with connecting mechanism on each side, and the solenoids are separably connected with each other by the connecting mechanisms.

In the preferred embodiment of the present invention, each of the above connecting mechanisms has engaging rims and engaging grooves running in parallel to axial lines of the solenoids. By bringing the two solenoids closer to each other along axial line from different positions in axial direction and by engaging each of the engaging rims with each of the engaging grooves of the other solenoid, these solenoids are connected tightly with each other and overlapped without causing gap between them.

Each of the above two solenoids is provided with one mounting hole respectively, and the two solenoids connected integrally are fixed at the desired position by two bolts, which are passed through the above mounting holes.

To facilitate the supply of power to the two solenoids, there are provided a plurality of receiving terminals on each solenoid, a terminal block mounted on the connected two solenoids, and a power feeding device having a terminal board retained on said terminal block. Said terminal board is provided with a plurality of power feeding terminals to match said receiving terminals, and by mounting the terminal boards on the terminal block, said feeding terminals and said receiving terminals are connected with each other.

In the above electromagnetic valve, two manual operators are provided to match each of the solenoids in order to switch over the pilot fluids by manual operation.

Of the above two manual operators, one manual operator comprises a push type operating shaft and a spring to bring back said operating shaft. By pushing the operating shaft, a movable iron core of the solenoid is moved, and pilot fluid pressure is applied on one of the pistons. The other manual operator has a push type operating shaft and a spring to bring back the operating shaft. By pushing the operating shaft, communication of pilot passage is switched over, and pilot fluid pressure is applied on the other piston.

It is desirable that the above two manual operators are arranged at different positions in different axial lines of main valve disc on upper surface of the body of the electromagnetic valve, that the manual operator to operate to operate the piston on left side of the main valve disc is arranged on left side of axial line, and that the manual operator to operate the piston on right side of the main valve disc is arranged on right side of the axial line. As a result, it is possible to prevent erroneous operation in switching over the two manual operators and to move main valve disc in erroneous switching direction.

DETAILED DESCRIPTION OF THE PREFERRED EMBODIMENT

Figure 1:
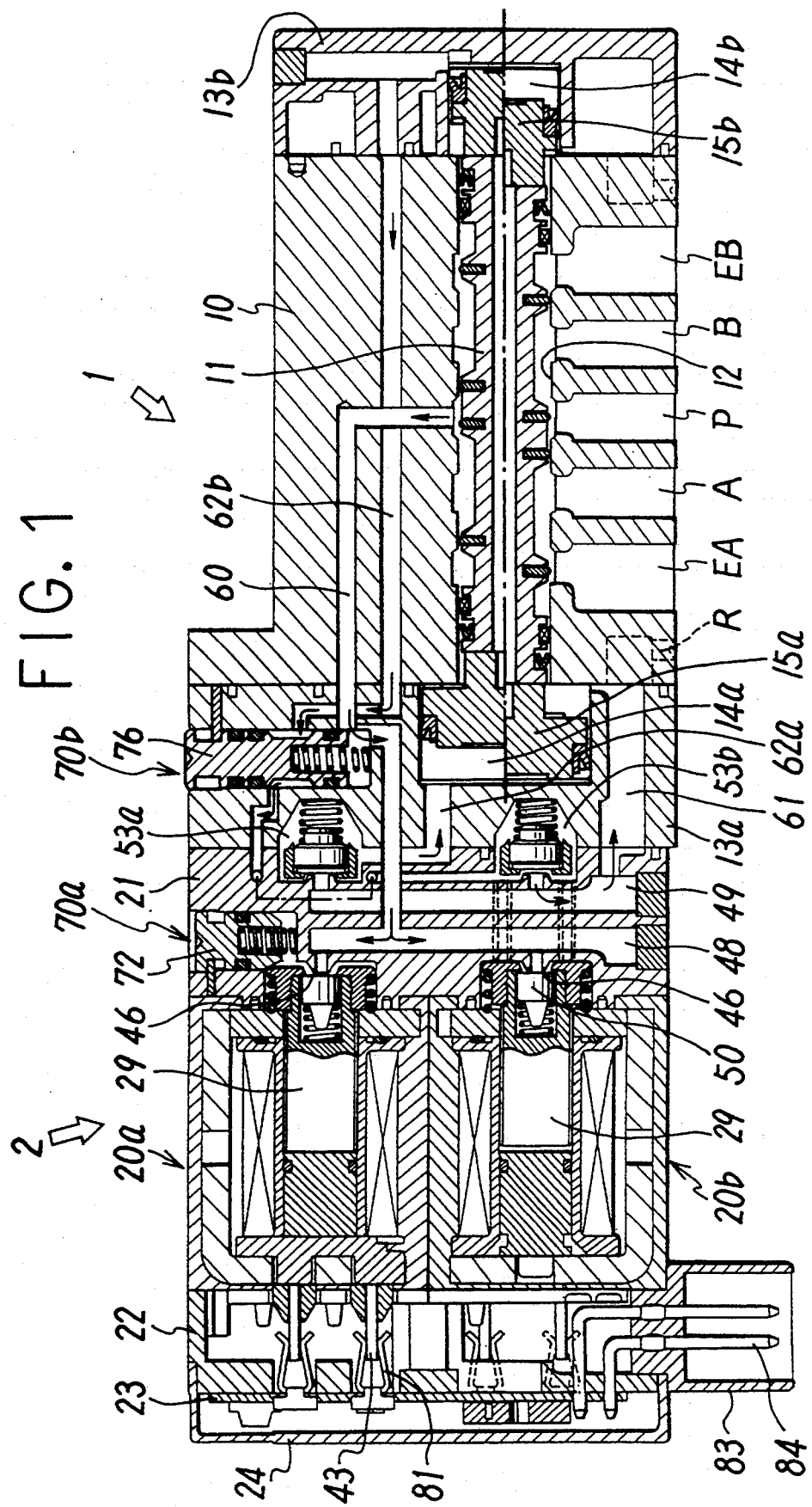
FIG. 1 is a cross-sectional view showing an embodiment of a double-solenoid type electromagnetic valve of the present invention.

FIGS. 1 to 5 each represents an embodiment of the double-solenoid type electromagnetic valve according to the present invention. As it is evident in FIGS. 1 and 4, the double-solenoid type electromagnetic valve comprises a main valve unit 1 incorporated with a spool type main valve disc 11 to control main fluid such as compressed air, and a pilot valve unit 2 for controlling pilot fluid to switch the main valve disc 11, and said pilot valve unit 2 is provided with a first solenoid 20a and a second solenoid 20b.

A valve body 10 in shape of approximately rectangular parallelopiped in the above main valve unit 1 comprises an input port P, output ports A and B, discharge ports EA and EB and a valve bore 12 to communicate these ports with each other, and said main valve disc 11 is inserted in said valve bore 12 so that it can be slided in axial direction. On both ends of said valve body 10, end plates 13a and 13b each in shape of a rectangular parallelopiped are mounted, and piston chambers 14a and 14b are formed on the end plates 13a and 13b respectively to face to said valve bore 12. In these piston chambers, a first piston 15 and a second piston 15b with different pressure receiving areas are arranged so that the pistons are slided in axial direction of the main valve disc 11. When the main valve disc 11 is pushed rightward by the first piston 15a as shown in the upper half of FIG. 1, ports P and A and ports B and EB are communicated with each other. When the main valve disc 11 is pushed leftward by the second piston 15b as shown in the lower half of FIG. 1, the ports P and B and ports A and EA are communicated with each other.

As it is evident from FIG. 2, said pilot valve unit 2 comprises a first solenoid 20a and a second solenoid 20b aligned at upper and lower positions and connected with each other by a means as described later, a pilot valve body 21 serving as a switching base for supplying or discharging pilot fluid to or from said piston chambers 14a and 14b, a terminal block 22 comprising a power feeding means for feeding power to the solenoids 20a and 20b, a terminal board 23 retained on said terminal block 22, and a cover for covering said terminal board 23.

Figure 5:
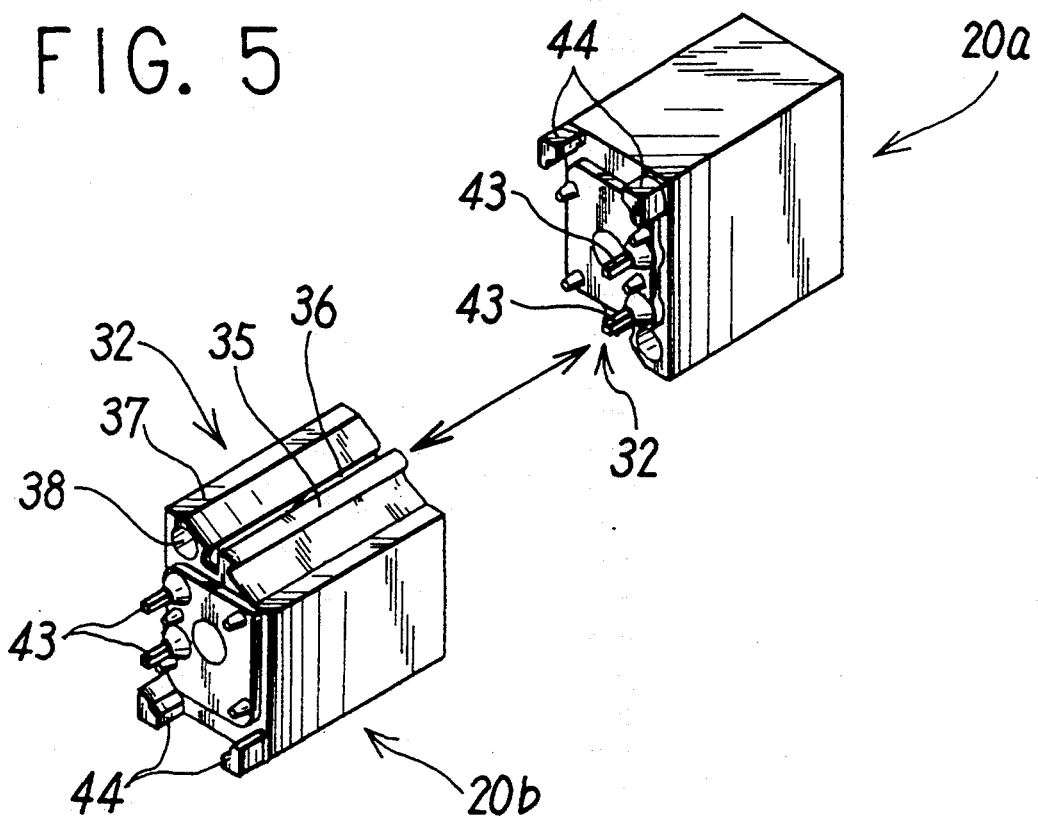
FIG. 5 is an exploded perspective view of a solenoid mechanism.
Figure 6:
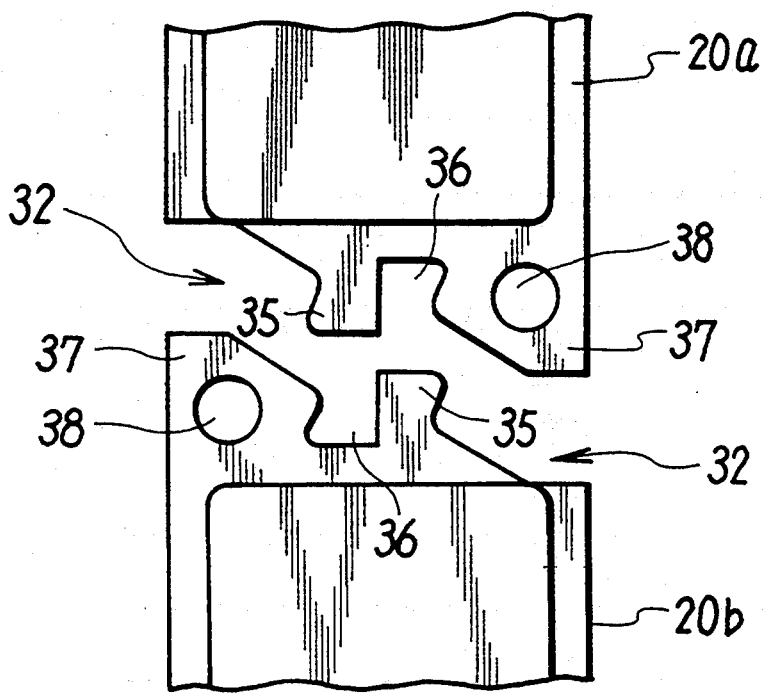
FIG. 6 is a front view of a connecting mechanism of the solenoid when it is sepatated.

The above two solenoids 2al and 20b are designed in such manner that these have the same structure and the same external shape and have the following construction: Each of the solenoids 20a and 20b comprises a coil 27 wound on a bobbin 26 made on non-magnetic material, a fixed iron core 28 fixed in a iron core chamber at the center of said bobbin 26, a movable iron core 29 movable in axial direction within the iron core chamber, and a magnetic frame 30 enclosing these components and made of magnetic material, and by molding the circumference of said magnetic frame with an insulating material 31 such as synthetic resin, an irregular rectangular parallelopiped having three sides each in form of plane and a connecting mechanism 32 on the remaining one side as seen in FIGS. 5 and 6 is provided.

Figure 4:
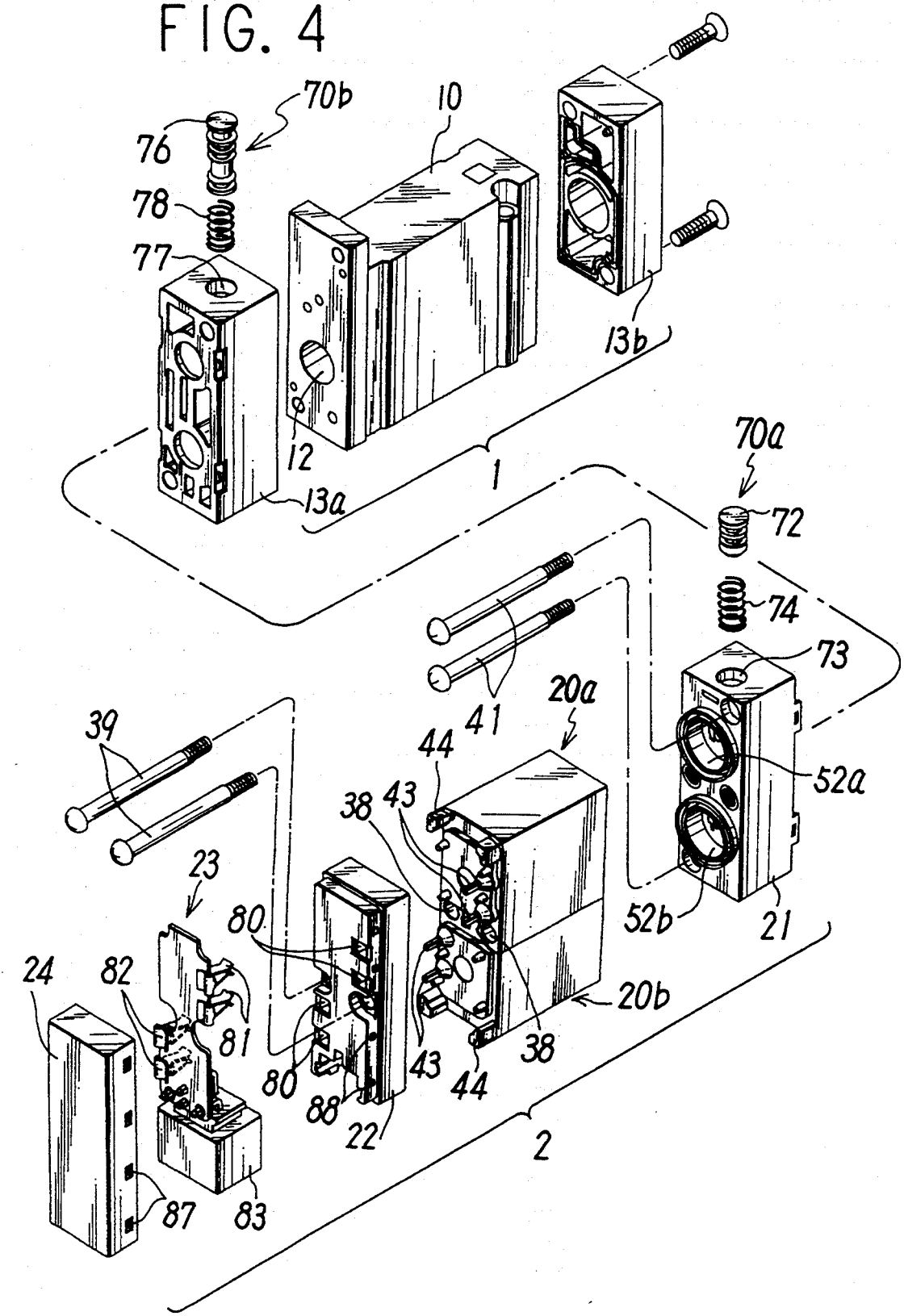
FIG. 4 is an exploded perspective view of the electromagnetic valve of FIG. 1.

In the above connecting mechanism 32, an engaging rim 35 with its top slightly thicker than its base arranged in parallel to axial line of each of the solenoids 20a and 20b is provided at a position deviated by a given distance from the center on the side in lateral direction toward either side, and an engaging groove 36 with groove width at bottom slightly enlarged is provided in parallel to axial line of each of the solenoids 20a and 20b at a position deviated by the same distance as in the above engaging rim 35 from the center toward the opposite side. At outer end of the engaging groove 36, a projected wall 37 is provided in parallel to said engaging groove 36. On outer side of the engaging rim 35, a recess 40 to match said projected wall 37 is provided, and a mounting hole 38 is formed inside said projected wall 37. As shown in FIG. 5, the above two solenoids 20a and 20b are arranged at different positions in axial direction with connecting mechanisms 32 facing to each other. By bringing them closer along axial line to each other and by engaging each engaging rim 35 in the engaging groove 36 of the other solenoid, these are connected and overlapped tightly without using any screw and without causing gap between them as shown in FIG. 4.

When one of the two solenoids 20a and 20b thus connected falls in trouble, and the two solenoids are to be separated to replace it, these can be easily separated by reversing the connecting procedure. Also, in this case, it will suffice that one type of solenoid is furnished because the two solenoids are designed in the same structure and in the same external shape. Accordingly, it is easy to correct the trouble when one of them is in failure.

In the mounting hole 38 formed inside the projected wall 37, bolts 39 are passed through, and each of the solenoids 20a and 20b are fixed by the bolts in the pilot valve body 21 together with the terminal block 22. In this case, since the two solenoids 20a and 20b are firmly connected together by the connecting mechanism 32 as described above, it is possible to firmly fix the solenoids 20a and 20b on the pilot valve body 21 by the above two bolts 39 and 39. The pilot valve body 21 is fixed on the valve body 10 together with the end plate 13a by bolts 41.

On end surface of each of the solenoids 20a and 20b facing to the terminal block 22, a receiving terminal 43 comprising two pins is projected respectively, and a projection 44 for positioning when the terminal block 22 is mounted is provided at end corner on both ends on the side opposite to the side where the above connecting mechanism is arranged.

The pilot valve body 21 comprises two pilot supply valve seats 46 and 46, two pilot discharge valve seats 47 and 47 formed in opposite direction at coaxial position to the pilot supply valve seats 46 and 46, a pilot common input passage 48 communicated with the pilot supply valve seats 46 and 46, and a common discharge passage 49 communicated with the pilot discharge valve seats 47 and 47, whereby the pilot supply valve seats 46 are opened or closed by pilot supply valve discs 50 retained on the movable iron cores 29 of the solenoids 20a and 20b, and the pilot discharge valve seats 47 are opened or closed by pilot discharge valve discs 51 arranged in discharge valve chests 53a and 53b between the pilot valve body 21 and the end plate 13a.

Each of the pilot supply valve discs 50 is pushed together with the movable iron core 29 by springs 55 within supply valve chests 52a and 52b toward the direction to close the pilot supply valve seat 46, and each of the pilot discharge valve discs 51 is pushed by springs 58 toward the direction to close the pilot discharge valve seats 47. As represented by lower solenoid 20b in FIG. 1, the supply valve chests 52a and 52b and the discharge valve chests 53a and 53b where the valve discs 50 and 51 are accommodated are communicated with each other by a communication passage 56, and a valve rod 57 linked with the pilot supply valve disc 50 and used to open or close the pilot discharge valve disc 5 is freely engaged in each of the communication passages 56. When the pilot supply valve disc 50 is closed, the valve rod 57 is pushed against the force of the spring 58 and opens the pilot discharge valve disc 51. When the pilot supply valve disc 50 is opened, the pilot discharge valve disc 51 is closed by resilient force of the spring 58. Accordingly, when power is connected to the solenoids 20a and 20b and the movable iron core 29 is attracted to the fixed iron core 28 (the status of the upper solenoid 20a in FIG. 1), the pilot supply valve disc 50 opens the pilot supply valve seat 46, and the pilot discharge valve disc 51 closes the pilot valve discharge valve seat 47. When power to the solenoids is shut off and the movable iron core 29 is separated from the fixed iron core 28 (the status of the lower solenoid 20b in FIG. 1), the pilot supply valve disc 50 closes the pilot supply valve seat 46 and the pilot discharge valve disc 51 opens the pilot discharge valve seat 47.

The pilot common input passage 48 is communicated with an input port P via a pilot supply passage 60 through a manual operator 70b as described later, and a pilot common discharge passage 49 is communicated with a pilot discharge port R via a pilot discharge passage 61. Also, the discharge valve chest 53a on the solenoid 20a side is communicated with the piston chamber 14a through a pilot output passage 62a, and the discharge valve chest 53b on the solenoid 20b side is communicated with the piston chamber 14b via another pilot output passage 62b through the above manual operator 70b. Therefore, when one solenoid 20a is actuated and the pilot supply valve seat 46 is opened and the pilot discharge valve seat 47 is closed, the pilot fluid flows into the discharge valve chest 53a through the communication passage 56 from the supply valve chest 52a and then flows into the piston chamber 14a through the pilot output passage 62a. As a result, the piston 15a is pushed, and the main valve disc 11 is moved to the right in FIG. 1. In this case, the piston chamber 14b on the opposite side is communicated with the pilot discharge port R through the pilot output passage 62b and the discharge valve chest 53b. When the other solenoid 20b is actuated and the pilot supply valve seat 46 is opened and the pilot discharge valve seat 47 is closed, the pilot fluid flows into the discharge valve chest 53b from the supply valve chest 52b through the communication passage 56 and then flows into the piston chamber 14b through the pilot output passage 62b. Thus, the piston 15b is pushed, and the main valve disc 11 is moved to the left in FIG. 1. In this case, the piston chamber 14a on the opposite side is communicated with the pilot discharge port R through the pilot output passage 62a and the discharge valve chest 53a.

Two manual operators 70a and 70b to match the Solenoids 20a and 20b are provided in order that the main valve disc 11 can be switched over by manual operation when the solenoids 20a and 20b cannot be actuated due to power suspension.

The manual operators 70a to match the solenoid 20a is provided with an operating shaft 72 tapered to its forward end. This operating shaft 72 is inserted into a bore 73 so that it can be moved in axial direction and it is pushed by a spring 74 in retracting direction. In this manual operator 70a, when the operating shaft 72 is pushed by the spring 74 and is at retracted position, its forward end is separated from the movable iron core 29 of the solenoid 20a. When, the operating shaft 72 is pushed in against the force of the spring 74 as shown in FIG. 1, the side of the forward end touches the movable iron core 29, which closes the pilot supply valve seat 46 and moves the movable iron core 29 back, thus opening the pilot supply valve seat 46. As a result, the pilot fluid flows into the piston chamber 14a from the supply valve chest 52a through the discharge valve chest 53a and from the pilot output passage 62a. Thus, the piston 15a is pushed, and the main valve disc 11 is moved to the right in FIG. 1. When the operating shaft 72 is released, the operating shaft 72 is returned by the force of the spring 74 and the movable iron core 29 is released. As a result, the pilot supply valve seat 46 is closed.

Figure 3:
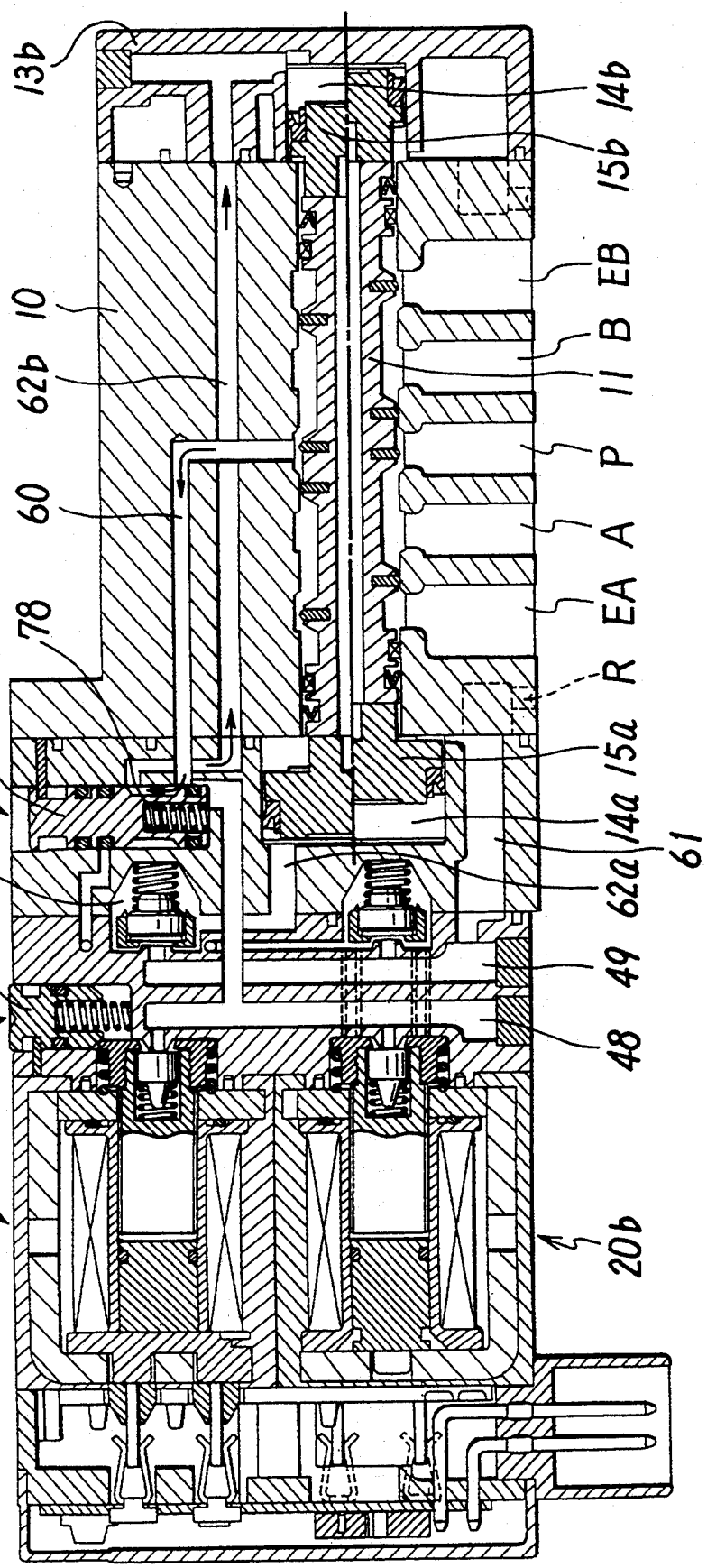
FIG. 3 is a cross-sectional view showing different operating conditions of the electromagnetic valve of FIG. 1.

In the manual operator 70b to match the solenoid 20b, an operating shaft 76 to switch over the communication of these passages is inserted in axial direction in a bore 77, to which the pilot supply passage 60 and the pilot output passage 62b are opened, and it is pushed by force of a spring 78 in retracting direction. In the manual operator 70b, when the operating shaft 76 is pushed by the spring 78 and is at retracted position, the pilot supply passage 60 makes the input port P communicate with the pilot common input passage 48, and the passage 62b makes the piston chamber 14 communicate with the discharge valve chest 53b on the solenoid 20b side. When the operating shaft 76 is pushed in against the force of the spring 78, the communication of the above passages is switched over by the operating shaft 76 as shown in FIG. 3, and the pilot supply passage 60 is communicated with the pilot output passage 62b. As a result, the input port P is directly communicated with the piston chamber 14b. Thus, the pilot fluid flows into the piston chamber 14b, pushes the piston 15b and moves the main valve disc 11 leftward in the figure. When the operating shaft 76 is released, the operating shaft 76 is returned by the force of the spring 78, and the passages are communicated with each other as shown in FIG. 1.

In the above two manual operators 70a and 70b, one manual operator 70a is provided on the pilot valve body 21 in such manner that it can be operated from above, and the other manual operator 70b is provided on the end plate 13a so that it can be operated from above. Thus, the manual operator 70a to move the piston 15 on left side of the main valve disc 11 is arranged at left in axial direction of the main valve disc 11, and the manual operator 70b to move the piston 15b at the right of the main valve disc 11 is at the right of the same. As a result, the relative positions of the two manual operators 70a and 70b and the switching direction of the main valve disc 11 can be easily understood, and this prevents erroneous operation which often occurs when these are aligned at the same position along the axial line.

Also, one manual operator 70a is designed to directly move the movable iron core 29 by the operating shaft 72, and the other manual operator 70b is designed to switch over the communication of the passages without moving the movable iron core 29. Thus, it is possible to easily arrange these manual operators 70a and 70b at different positions along axial line of the main valve disc 11 as described above. That is, when the two manual operators 70a and 70b are designed in such manner that the movable iron core 29 is directly moved by the operating shafts 72 and 76, the two operating shafts 72 and 76 must be positioned just above the forward ends of the corresponding movable iron cores 29 and 29 and designed to bypass the other manual operator and the passages related to it, and this requires very complicated structure. If the two manual operators 70a and 70b are designed in such manner as to switch over the communication of the passages, pilot passages become intricate, resulting in more complicated design and manufacture. In the present invention with the above arrangement, there is no possibility that the operating shafts 72 and 76 in the two manual operators 70a and 70b interfere with each other or that the pilot passages become intricate. This contributes to easier design and manufacture.

Figure 2:
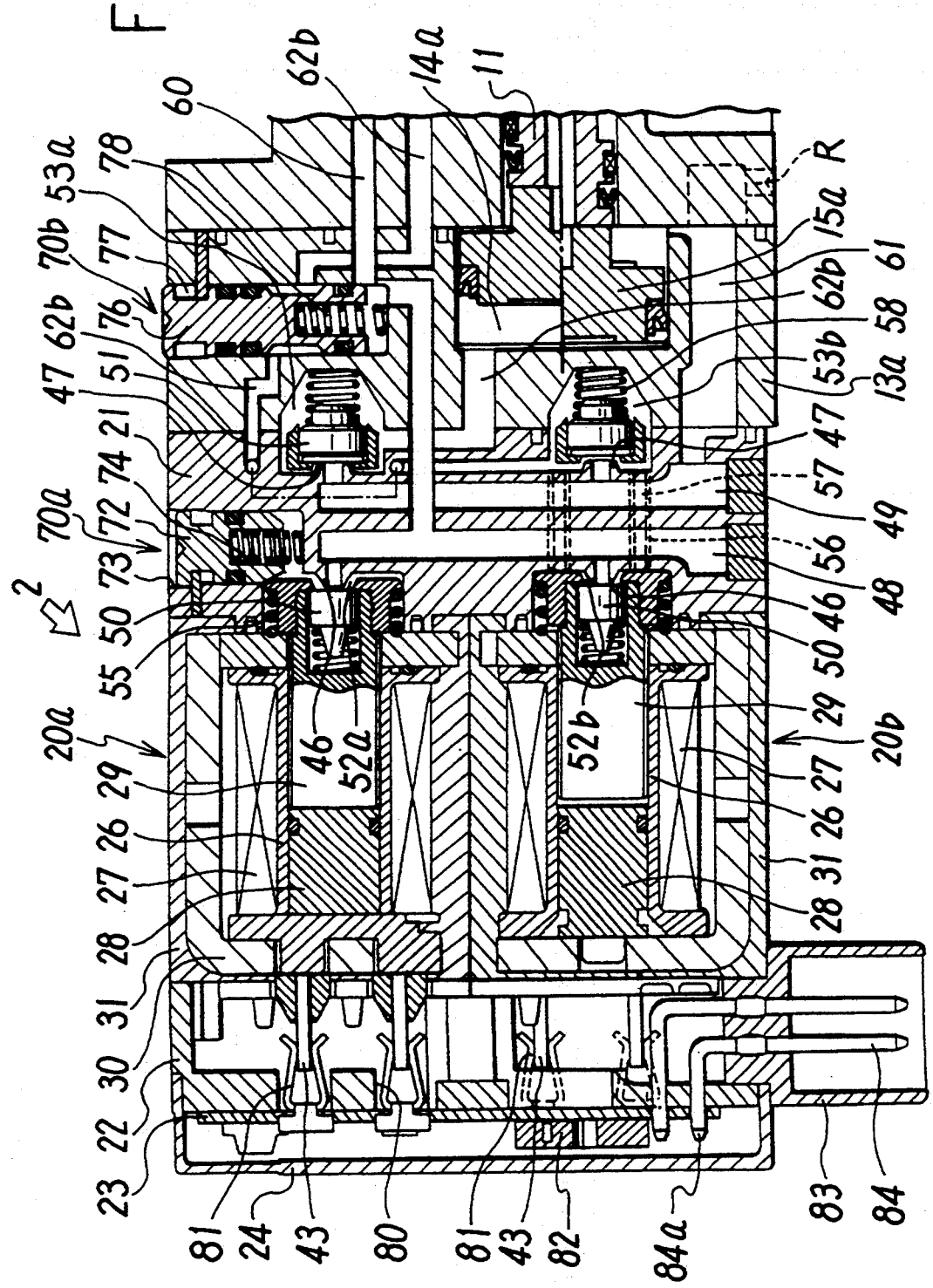
FIG. 2 is an enlarged view of an essential part of the electromagnetic valve of FIG. 1.

As it is evident from FIG. 2 and FIG. 4, the terminal block 22 to constitute power feeding means to feed power to the solenoids 20a and 20b is removably fixed on end surfaces of the two connected solenoids 20a and 20b by the above bolts 39, and holes 80 are provided at the corresponding positions to match the receiving terminals 43 of the solenoids 20a and 20b.

The terminal board 23 is provided with electrical components 82 such as indicator lamp, counter electromotive force preventive device, etc. in addition to the power feeding terminals 81 as many as the receiving terminals 43 of the solenoids 20a and 20b. On lower end of the terminal board 23, a terminal box 83 with a plug terminal 84 for connecting to power supply is removably mounted in such manner that forward end 84a of the plug terminal 84 is engaged in a hole of the terminal board 23. The terminal board 23 is mounted on outer surface of the terminal block 22 by inserting the feeding terminal 81 into a hole 80 of the terminal block 22 and by connecting it to each of the receiving terminals 43 of the solenoids 20a and 20b.

The cover 24 to cover the terminal board 23 has a plurality of engaging holes 87 on its side. By engaging nails 88 on outer side of the terminal block 22 into these engaging holes 87, the cover is removably mounted on the terminal block 22.

It is needless to say that the present invention is not limited to the structure of the above embodiment, and various modifications and changes may be made within the spirit and the scope to attain the objects of the invention.

What we claim are:

1. A double-solenoid type electromagnetic valve, comprising:
a main valve unit, having a main valve disc provided in a valve bore slidably in an axial direction thereof, and a pair of pistons arranged on both ends in an axial direction of said main valve disc, said main valve unit controlling a main fluid by switching over the main valve disc via said pistons driven by pilot fluid pressure; and
a pilot valve unit having two solenoids for selectively applying said pilot fluid pressure on said pistons by action of the solenoids, wherein the two solenoids in said pilot valve unit have the same structure and the same external shape and are provided each with a connecting mechanism on a side thereof and are separably connected to one another via said connecting mechanism.

2. A double-solenoid type electromagnetic valve according to claim 1, wherein said connecting mechanism has an engaging rim and an engaging groove aligned parallel to an axial direction of each of the solenoids such that by moving the two solenoids towards one another along said axial direction and by engaging the engaging rim of one solenoid with the engaging groove of the other solenoid, the two solenoids are closely connected and overlapped without any gap therebetween.

3. A double-solenoid type electromagnetic valve according to claim 1, wherein each of the two solenoids has one mounting hole, and the two solenoids integrally connected are fixed at a predetermined position by two bolts inserted through said mounting holes.

4. A double-solenoid type electromagnetic valve according to claim 1, wherein there is provided a power feeding means for feeding power to the two solenoids, said power feeding means comprising a plurality of receiving terminals mounted on each solenoid, one terminal block mounted on the connected two solenoids, and a terminal board retained on said terminal block, said terminal board being provided with a plurality of power feeding terminals to match said receiving terminals such that by mounting said terminal board on said terminal block, said power feeding terminals and said receiving terminals are connected together.

5. A double-solenoid type electromagnetic valve according to claim 1, wherein two manual operators to match the solenoids are provided to switch over the pilot fluid by manual operation.

6. A double-solenoid type electromagnetic valve according to claim 5, wherein one of said manual operators has a push type operating shaft and a spring to return said operating shaft such that by pushing said operating shaft, a movable iron core of the solenoid is moved and pilot fluid pressure is applied on one of the pistons, and wherein the other manual operator has a push type operating shaft and a spring to return said operating shaft such that by pushing said operating shaft, communication of pilot passages is switched over, and the pilot fluid pressure is applied on the other piston.

7. A double-solenoid type electromagnetic valve according to claim 5, wherein the two manual operators are at different positions along an axial direction of the main valve disc on the body of the electromagnetic valve and are located on the same side as the pistons driven by each manual operator.

* * * * *